(12) United States Patent
Imai et al.

(10) Patent No.: US 6,927,388 B2
(45) Date of Patent: Aug. 9, 2005

(54) OPTICAL ENCODER

(75) Inventors: Keisuke Imai, Yamanashi (JP); Hiroya Terashima, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 0 days.

(21) Appl. No.: 10/829,258

(22) Filed: Apr. 22, 2004

(65) Prior Publication Data

US 2004/0245443 A1 Dec. 9, 2004

(30) Foreign Application Priority Data

Apr. 24, 2003 (JP) ........................................ 2003-119913

(51) Int. Cl.$^7$ ................................................ G01D 5/34
(52) U.S. Cl. ..................... 250/231.13; 341/13; 341/31
(58) Field of Search ..................... 250/231.13, 231.14, 250/231.15, 231.16, 231.17, 231.18, 237 G, 237 R; 356/373, 375; 341/13, 31

(56) References Cited

U.S. PATENT DOCUMENTS

| | | | |
|---|---|---|---|
| 3,598,493 A | | 8/1971 | Fisher |
| 4,536,650 A | | 8/1985 | Carena et al. |
| 5,747,797 A | * | 5/1998 | Fujita ............... 250/231.14 |
| 6,222,183 B1 | * | 4/2001 | Taniguchi et al. ..... 250/231.13 |
| 6,232,593 B1 | * | 5/2001 | Taniguchi et al. ..... 250/231.13 |
| 6,255,644 B1 | * | 7/2001 | Taniguchi et al. ..... 250/231.13 |
| 6,713,756 B2 | * | 3/2004 | Yamamoto et al. .... 250/231.13 |

FOREIGN PATENT DOCUMENTS

| | | |
|---|---|---|
| DE | 977 471 | 8/1966 |
| DE | 100 36 769 A1 | 2/2002 |
| EP | 0 947 807 A2 | 10/1999 |
| FR | 2 676 538 | 11/1992 |
| JP | 07-270185 | 10/1995 |
| JP | 10-170308 | 6/1998 |
| JP | 10-239108 | 9/1998 |
| JP | 11-201779 | 7/1999 |

* cited by examiner

Primary Examiner—Thanh X. Luu
Assistant Examiner—Seung C. Sohn
(74) Attorney, Agent, or Firm—Staas & Halsey LLP

(57) ABSTRACT

An optical encoder whose environmental resistance is improved by increasing the variety of options of materials for a resin-made code plate thereof. Used as material for at least a code pattern of the code plate of the optical encoder is one which meets the condition that the material has spectral transmittance of 70% or more with respect to detection light and that of 50% or less with respect to partial light (for example blue light) of visible wavelengths in translucent sections. If infrared light having wavelengths between 800 nm and 1000 nm is used as detection light, it is preferable to apply polyetherimide, polyethersulfone or polyphenylsulfone as a colored resin material. These materials are excellent in heat resistance, oil resistance, etc., compared to transparent and colorless materials (PMMA, PC, glass, etc.) which have been conventionally used, and hardly cause melting, deformation, white turbidity, etc., in a harsh environment.

4 Claims, 5 Drawing Sheets

OPTICAL ENCODER

BACKGROUND OF THE INVENTION

1. Field of the Invention

The present invention relates to an optical encoder for use in combination with, for example a rotary shaft of a motor or the like, and more specifically to an optical encoder using a code plate formed of resin material.

2. Description of the Related Art

As a code plate of an optical encoder requiring high accuracy, one made of clear glass, which is provided with a pattern by chrome deposition and etching, has been conventionally utilized. In recent years, however, due to the improvement of the molding and transferring technology, an optical resin which is colorless and transparent is much more likely to be used instead of glass materials. The main reason for this is that in general resin material, compared to glass, are excellent in mass productivity because of ease of molding and have an advantage in cost for manufacturing. There are many different kinds of well-known constructions of code plates made of transparent resin. One of examples of such constructions is illustrated in FIG. 1.

As shown in FIG. 1, a code pattern of the resin-made code plate includes flat portions serving as translucent sections which directly transmit the light supplied from a light source (not shown) and portions with a series of V-shaped grooves, which serve as non-translucent sections (reflecting sections). Each V-shaped groove of the grooved portions is formed to have an oblique angle causing total reflection of the light incident from the inner side of the code plate. The resin-made code plate with such a code pattern is usable also in an optical encoder of a type which detects either a transmitted or reflected light by a detecting unit. In case that a transmitted light is detected by the detecting unit, the transmitted light forms so-called "bright sections", and so-called "dark sections" are produced correspondingly to the portions with a series of V-shaped grooves (reflecting sections). On the contrary, in case that a reflected light is detected by the detecting unit, the reflected light creates so-called "bright sections", and so-called "dark sections" are formed correspondingly to the translucent sections.

An infrared LED is largely utilized as a light source which emits light for detection. According to this, used as a light-receiving element for detection is infrared light having wavelengths between about 800 nm and about 1000 nm and also having high sensitivity. Used as a transparent resin in general is polymethyl methacrylate (PMMA), polycarbonate (PC) or the like. These materials, as described later, have high spectral transmittance in a broad wavelength range extending from blue light to infrared light. The materials are substantially transparent and colorless, and also excellent in moldability and transferability. Because of such material properties, these materials are extensively used not only for resin code plates but also for other optical elements, such as optical discs and lenses of CDs and DVDs.

However, resins, such as polymethyl methacrylate and polycarbonate, which have been conventionally used for making code plates, have a great disadvantage in heat resistance and oil resistance (resistance against oily substances). This disadvantage is not negligible since the optical encoder is most typically applied in the periphery of the rotary shaft of an industrial motor, which is liable to reach a considerably high temperature. In such a place, there is fear that the optical encoder contacts high-temperature steam and cutting oil. If a code plate made of polymethyl methacrylate or polycarbonate is utilized in such a harsh environment, this produces problems that the high-temperature steam and the cutting oil cause deterioration and white turbidity of the surface phase the code plate, that the surface of the code plate is melted to alter the shape of surface of the V-shaped groove, which makes it impossible to obtain a satisfactory light-and-shade contrast, and the like.

Disclosed examples of an optical encoder using a resin-made code plate includes JP 7-270185A, JP 10-170308A, JP 10-239108A, and JP 11-201779A. JP 7-270185A describes a rotating disk (code plate) formed by bonding two transparent film disks whose base materials are a plastic resin to each other, applying a sensitive material onto one side thereof to form a slit side having a plurality of slits in the circumferential direction, and forming a transparent side made of the same material as the slit side on the other side, in order to averting the deformation of the rotating disk (code plate).

Disclosed in JP 10-170308A is a rotary encoder using a code plate formed by providing a plurality of recessed and projecting parts onto a disk made of a light-transmitting synthetic resin and having a construction in which the recessed parts are filled up with a substance which does not transmit light. JP 10-239108A describes a code plate whose converting portion (code pattern), which is composed of a line of lens elements, is formed by plastic-molding. JP 11-201779A discloses an acrylic resin-made code plate sectioned into a first and a second type of strip-shaped regions to generate a first and a second type of output light having mutually different light paths, in which at least either one of the first or second type of region has a light path changing function.

Although each of the above-described examples of prior art uses plastic as a construction material of the code plate, none of them teaches using a colored resin material. This means that, on the level of prior art, there has not been awareness that the code plate may be formed of a colored material as long as it has sufficient spectral transmittance with respect to the wavelength of the detection light, and that it has been assumed that material used for the code plate of an optical encoder must be transparent and colorless. Such fixed ideas have hindered free choice of material having great resistance against the high-temperature steam, cutting oil, etc.

As for JP 7-270185A, although a countermeasure against deformation is taken, the idea disclosed in the document is not based on the concept that the code plate may be colored if having sufficient spectral transmittance with respect to the wavelength of the detection light. Thus, the invention disclosed in the document intends to solve the problems by forming the code plate with the construction in which two film disks are bonded to each other. Such a bonding construction, however, is disadvantageous in terms of costs, and moreover the bonded portion would possibly come unstuck.

SUMMARY OF THE INVENTION

The present invention makes it possible to choose resin material without an fixed idea that material used for making a code plate of an optical encoder must be transparent and colorless and to freely apply material having excellent resistance against high-temperature steam, cutting oil and the like to the code plate (especially, a code pattern) of the optical encoder.

An optical encoder of the present invention comprises: a light emitting unit for emitting light; a light receiving unit for detecting light having wavelengths in a predetermined detection range emitted from the light emitting unit; and a code plate arranged between the light emitting unit and the light receiving unit, and having a code pattern formed of resin material to be constituted of translucent portions and non-translucent portions. The resin material has spectral transmittance not less than 70% with respect to the light having wavelengths in the predetermined detection range and has spectral transmittance not greater than 50% with respect to light having wavelengths in a range different from the predetermined detection range, which is at least a part of a visible wavelength range, at the translucent portions of the code pattern.

A typical light having wavelengths in the predetermined detection range is infrared light. The resin material may have spectral transmittance not greater than 50% with respect to blue visible light.

The resin material may be selected from polyetherimide, polyethersulfone and polyphenylsulfone. These materials show high spectral transmittance in a range between 800 nm and 1000 nm and have excellent resistance against high-temperature steam, cutting oil and the like.

Articles molded from these materials, however, look yellowish like amber color with the naked eye. Therefore, owing to the above-mentioned traditional fixed ideas, the above-listed materials have been out of the options.

Even if the materials appear to have properties unsuitable for use with an optical element requiring accuracy, there is no problem as long as the materials meet the above conditions. The present invention possesses significance in terms of broadening options of materials and enabling actual application of a specific material (polyetherimide, polyethersulfone or polyphenylsulfone) as listed above, which is excellent in environmental resistance.

In this invention, the designation of the "spectral transmittance of 70% or more with respect to the detection light" is a result of consideration of conditions of the spectral transmittance with respect of the detection light which is practically suitable. Furthermore, the designation of the "spectral transmittance of 50% or less with respect to at least part of light having different wavelengths from the wavelengths used for detection and belonging to a visible wavelength range" is based on the concept that the resin material may be, for example, yellowish.

DETAILED DESCRIPTION

Figure 2:
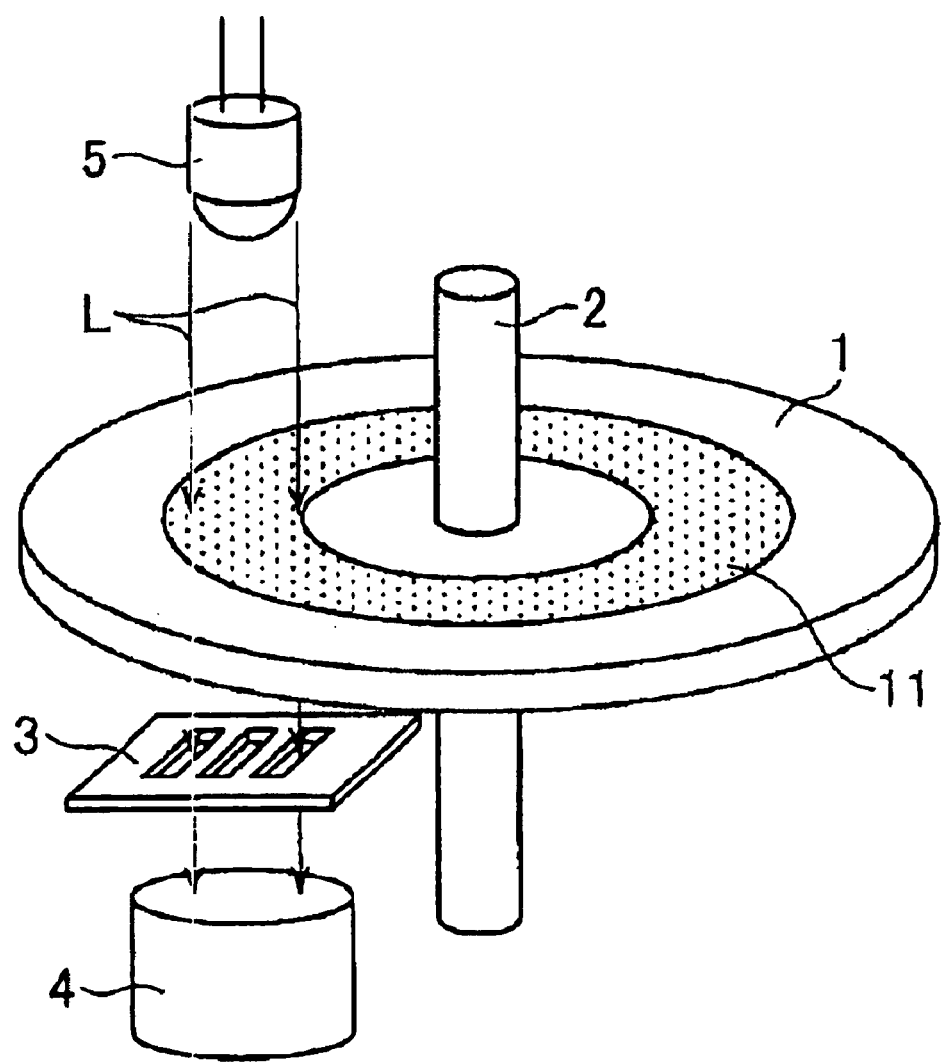
FIG. 2 is a schematic view showing one embodiment of a construction of an optical encoder to which the present invention is applied.

FIG. 2 is a schematic view showing one embodiment of a construction of an optical encoder to which the present invention is applied. As illustrated in FIG. 2, the optical encoder according to this embodiment is a rotary encoder comprising a code plate 1, a rotary shaft 2, a fixed slit member 3, a light-receiving unit 4, and a light-emitting unit 5 as basic components. In the light-emitting unit 5, one or more light-emitting elements, and if necessary, a lens and the like for parallelization of a beam are provided. As a light-emitting element, an infrared LED having emission wavelengths in an 800 to 1000 nm range is applied herein. The code plate 1 is provided with a code pattern having the after-mentioned aspect. The code plate 1, which is mounted on the rotary shaft 2, is so positioned that the code pattern thereof constantly intervenes between the light-emitting unit 5 and the light-receiving unit 4.

Infrared light which is supplied from the light-emitting unit 5 is modulated by the code pattern of the code plate 1 disposed in a light path leading to the light-receiving unit 4. The infrared light is then detected by the light-receiving unit 4 after passing through the fixed slit member 3, and processed by a well-known electric circuit (not shown) to be used for detecting a rotational position or rotational speed of a motor or the like.

Figure 3:
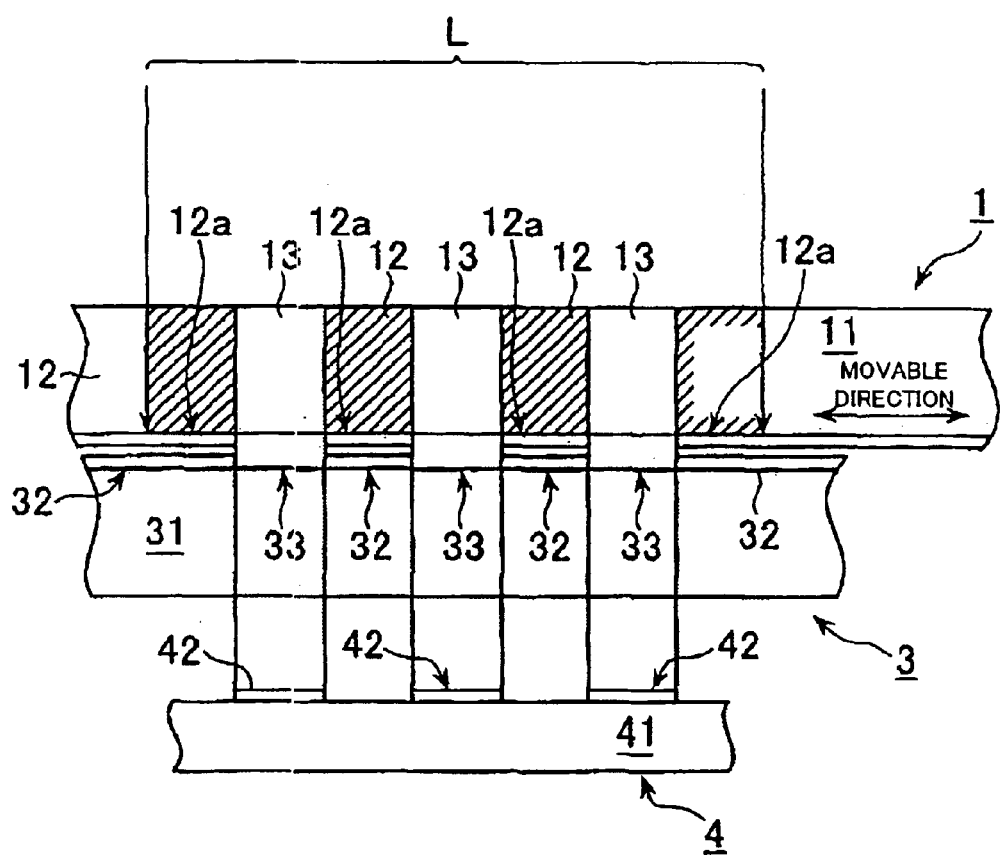
FIG. 3 is a partial cross-sectional view showing a code pattern of a code plate used for the optical encoder in FIG. 2 together with a fixed slit member and a light-receiving unit.

FIG. 3 is a partial cross-sectional view showing the code pattern of the code plate 1 used for the optical encoder in FIG. 2 together with the fixed slit member 3 and the light-receiving unit 4. The whole code plate 1 including a code pattern 11 is formed of a visibly colored resin material, such as polyetherimide, polyethersulfone, and polyphenylsulfone. As illustrated in FIG. 3, formed in the code pattern 11 are non-translucent sections (light-shielding sections) 12 and translucent sections 13 along a circumferential direction of the code plate 1 according to a given code pattern.

The code pattern 11 has a portion in which the non-translucent sections (light-shielding sections) 12 and the translucent sections 13 cyclically alternate with one another. The fixed slit member 3 is formed, for example, by making light-shielding strata 32 on a substrate 31 in a given pitch and making parts between the two respective adjacent light-shielding strata 32 into transmitting openings 33. On a substrate 41 of the light-receiving unit 4, there are disposed detection elements 42 having detection sensitivity to a detection light (herein, infrared light) correspondingly to the openings 33.

Among elements of the detection light (herein, infrared light) L emitted from the light source 5, those which have passed through the translucent sections 13 of the code plate 1 are separated away from the code plate 1 to pass through the openings 33 of the fixed slit member 3. The elements are then detected by the respective detection elements 42 to be converted into electronic signals.

Figure 1:
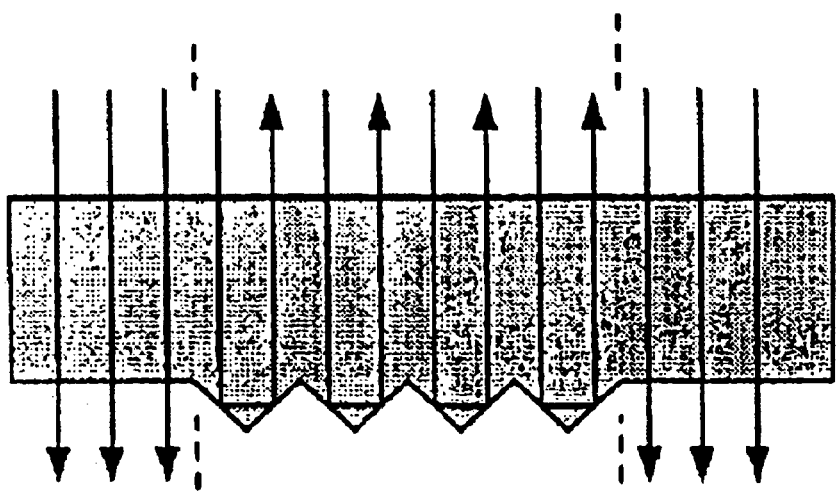
FIG. 1 is a view showing one example of a construction of a code plate using a transparent resin.
Figure 4:
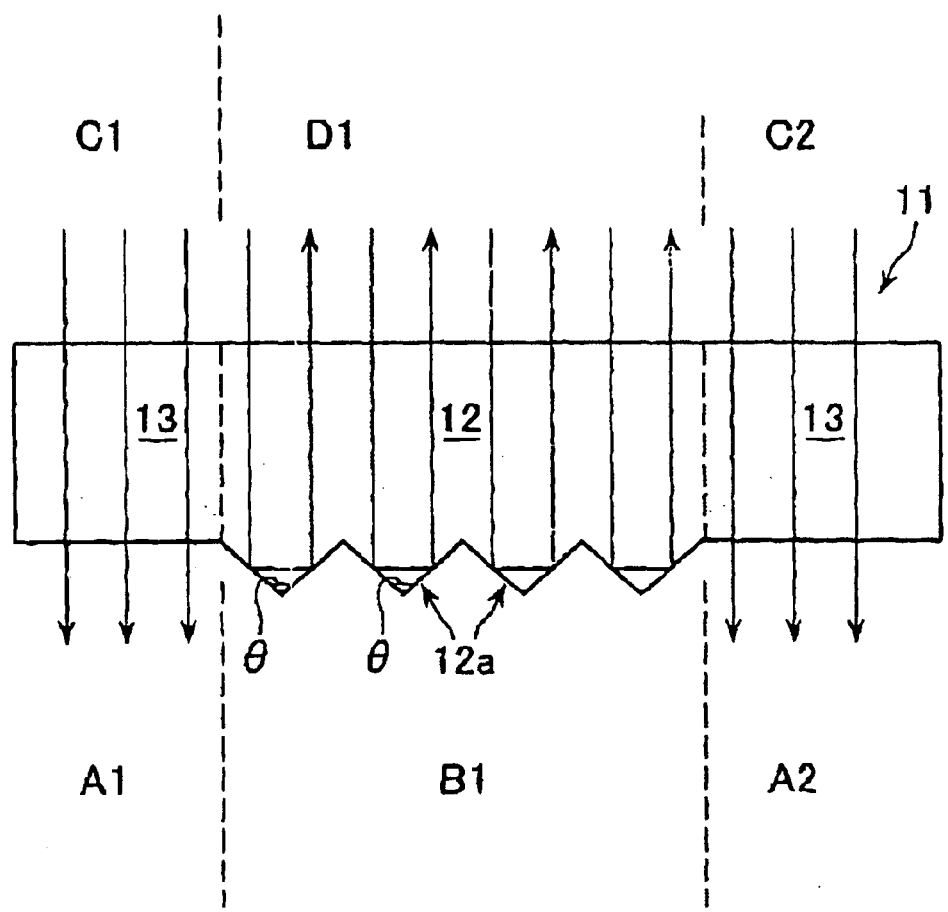
FIG. 4 is a cross-sectional view showing an extracted part of the code pattern of the code plate used in the optical encoder in FIG. 2.

Each of the non-translucent sections (reflecting sections) 12 of the code pattern includes a surface indicated by a reference numeral 12a (heavy line) in FIG. 3, on which there are formed a large number of V-shaped grooves identical to those shown in FIG. 1. FIG. 4 is a cross-sectional view showing an extracted part of the code pattern 11 to illustrate the aspect thereof. As shown in FIG. 4, the translucent section 13 of the code pattern 11 comprises a portion, both faces of which are flat, whereas the non-translucent section (reflecting section) 12 comprises a portion in which a series of many V-shaped grooves 12a is formed on the opposite face to the face upon which the detection light impinges.

A sectional shape of each groove 12a has an apex angle θ of each prism sequence formed in a projecting part, the apex angle θ being so determined that the detection light, which impinges upon an inner side of the projecting part, is substantially totally reflected. The specific condition thereof is $(90°-\theta/2)>\theta c$, in accordance with well-known basic optical theory. Herein, θc represents a critical angle which is determined by the relation between a refractive index of the material of the non-translucent section (reflecting section) 12 and a refractive index of air.

As illustrated in FIGS. 2 and 3, in the encoder of a type which detects a transmitted light by using the light-receiving unit, each of regions indicated by reference numerals A1 and A2 in FIG. 4 forms a so-called "bright section", while a region indicated by reference numeral B1 forms a so-called "dark section". In the case of the encoder of a type which detects a reflected light by using the light-receiving unit, a region indicated by reference numeral D1 in FIG. 4 forms a so-called "bright section", whereas each of regions indicated by reference numerals C1 and C2 forms a so-called "dark section".

As mentioned above, in the present embodiment, the infrared LED having emission wavelengths in the 800 to 1000 nm range is used as the light source 5, and a detection element having high detection sensitivity to the emission wavelengths is utilized as the light-receiving unit 4. Moreover, polyetherimide, polyethersulfone or polyphenylsulfone is used as resin material for making the code plate, especially the code pattern. These materials show high spectral transmittance (of 80% or more) in a range between 800 nm and 1000 nm and low spectral transmittance (of 50% or less) in at least part (especially a wavelength range of blue light) of a visible wavelength range.

Figure 5:
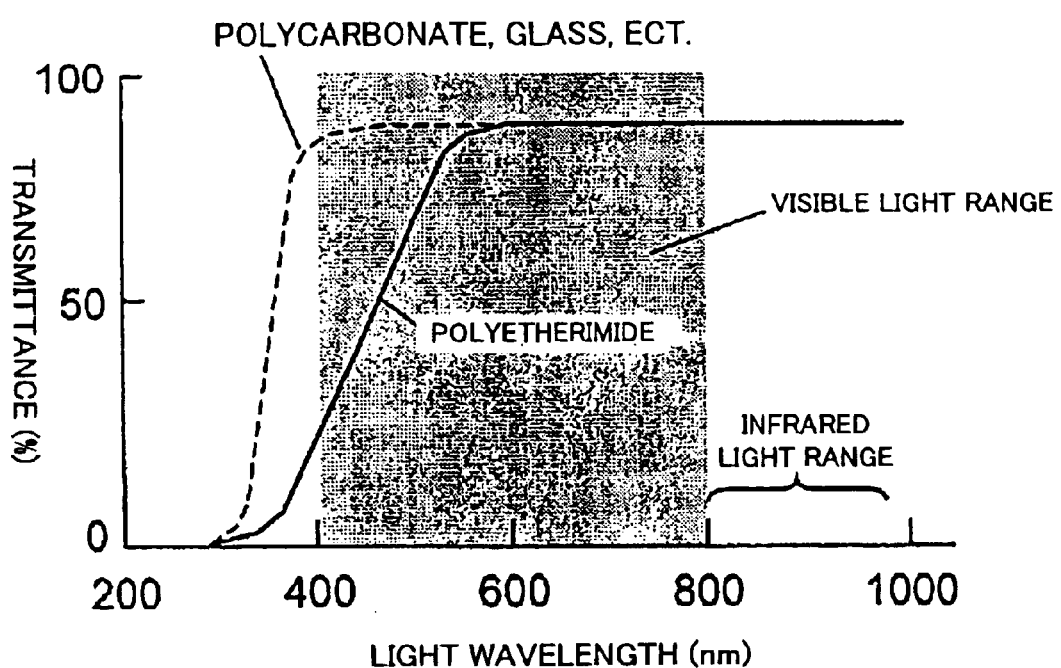
FIG. 5 is a graph showing a spectral transmittance curve for polyetherimide and polymethyl methacrylate (PMMA) together with a general spectral transmittance curve for transparent and colorless materials (PC, glass, etc.) which have been conventionally utilized.

No matter which of the materials, namely polyetherimide, polyethersulfone and polyphenylsulfone, is applied, the code plate has a thickness of about 1 mm to about 2 mm in general, and there would be no problem from a practical standpoint as long as the material shows the spectral transmittance of 80% or more with respect to light having detection light wavelengths (from 800 nm to 1000 nm). FIG. 5 is a graph showing, as an example, a spectral transmittance curve (transmitting spectrum curve) for polyetherimide together with a general spectral transmittance curve (transmitting spectrum curve) for transparent and colorless materials (PC, glass, etc.) which have conventionally been used.

In the same graph, a horizontal axis indicates wavelengths (in units of nanometer), and a vertical axis indicates spectral transmittance (in units of percentage). A condition for thickness of transmittance is "1 mm". As is obvious from FIG. 5, the general spectral transmittance curve for transparent and colorless materials (PC, glass, etc.) which is shown by a broken line indicates a substantially fixed high spectral transmittance in a wavelength range between about 400 nm and 1000 nm, resulting in a spectrum which suggests transparence and colorlessness of the materials.

On the contrary, polyetherimide exhibits substantially fixed high spectral transmittance (of 80% or more) in a wavelength range from about 600 nm to 1000 nm. In a shorter wavelength range, however, the spectral transmittance decreases, and more specifically, the spectral transmittance marks a sharp decline in a blue range. For instance, at a wavelength of approximately 435 nm, which is a typical wavelength of blue light, the spectral transmittance is much lower than 50%. It is considered that the low spectral transmittance in the blue range is an exact reason why polyetherimide looks yellowish. Although not shown in the drawing, spectral transmittance curves for polyethersulfone and polyphenylsulfone have the same characteristics to have yellow color (amber color) because of such characteristic.

Having a yellow color (amber color), the resin material which is typically used in this invention have been left out of consideration as materials for code plates. As in the above embodiment, however, if the materials are utilized in suitable combination with wavelengths (herein, infrared range between 800 nm and 1000 nm) of the detection light, there will be no problem in terms of optical functions. By doing so, variety of material options is increased, and thus it is possible to actually find a specific material which is excellent in high-temperature resistance, water resistance, oil resistance, etc., just like those mentioned above.

In other words, the materials listed above as examples, namely polyetherimide, polyethersulfone and polyphenylsulfone, are engineering plastic, which means that all of these materials have excellent heat resistance and chemical resistance, and are also high in resistance against cutting oil and the like. Therefore, using these materials for code plates, especially code patterns, suppresses changes in a surface shape, which is caused by deterioration, white turbidity, melting and the like of a surface phase due to high-temperature steam and cutting oil, thereby averting harmful effects on detection performance. This makes it possible to provide an optical encoder showing excellent resistance in an adverse environment, compared to one using a code plate formed of PMMA or PC as seen in prior art.

The present invention has been described with reference to the optical rotary encoder of a transmitted light detection type illustrated in FIGS. 1 through 4. The invention, however, is not limited to the above embodiment. For instance, as described in relation to FIG. 4, it is also possible to apply the invention to the code plate of an optical encoder of a reflected light detection type, and there is no limitation of sorts of code patterns. Furthermore, there are an optical encoder having a construction without a fixed slit member and one which is so designed that the fixed slit member is disposed between the code plate and the light source. Likewise, there is no particular limitation of constructions on the occasion of application of the invention.

It would be obvious that an optical linear encoder also offers the same functions and advantages if the above-mentioned materials are used for the code plate thereof, especially the code pattern. Although, in the above embodiment, the case of the infrared range (between 800 nm and 1000 nm) is explained in association with the wavelengths used for detection, this is only an example. For instance, even if an LED having red emission wavelengths is used as the light-emitting unit 5 in place of the infrared LED, and the code pattern is formed of the above-mentioned material (polyetherimide, polyethersulfone or polyphenylsulfone), there is practically no problem as is apparent from the graph of FIG. 5.

The present invention makes variety of options of material used for the code plate of an optical encoder to expand a degree of freedom in selecting material having excellent resistance against high-temperature steam, cutting oil and the like, even from among materials appearing to be unsuitable for use in optical elements. As a result, it is possible to provide an optical encoder which hardly causes performance degradation caused by white turbidity and changes of the surface shape even if being used for a long period of time in a harsh environment.

What is claimed is:

1. An optical encoder comprising:
   a light emitting unit for emitting light;
   a light receiving unit for detecting light having wavelengths in a predetermined detection range emitted from said light emitting unit; and a code plate arranged between said light emitting unit and said light receiving unit, and having a code pattern formed of resin material to be constituted of translucent portions and non-translucent portions, wherein said resin material has spectral transmittance not less than 70% with respect to the light having wavelengths in the predetermined detection range and has spectral transmittance not greater than 50% with respect to light having wavelengths in a range different from the predetermined detection range, which is at least a part of a visible wavelength range, at said translucent portions.

2. An optical encoder according to claim 1, wherein the light having wavelengths in the predetermined detection range is infrared light.

3. An optical encoder according to claim 1, wherein said resin material has spectral transmittance not greater than 50% with respect to blue visible light.

4. An optical encoder according to claim 1, wherein said resin material comprises any one of polyetherimide, polyethersulfone and polyphenylsulfone.

* * * * *